Dec. 7, 1937.  R. CHILTON  2,101,239
SUPERCHARGER DRIVE
Filed Aug. 14, 1934  2 Sheets-Sheet 1

INVENTOR
Roland Chilton.
BY
ATTORNEY

Dec. 7, 1937.   R. CHILTON   2,101,239
SUPERCHARGER DRIVE
Filed Aug. 14, 1934   2 Sheets-Sheet 2
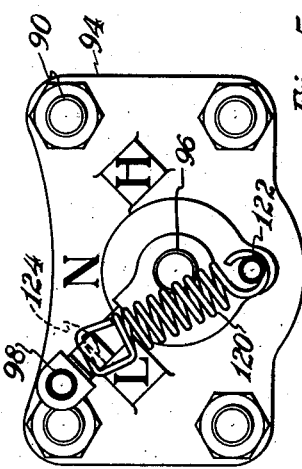
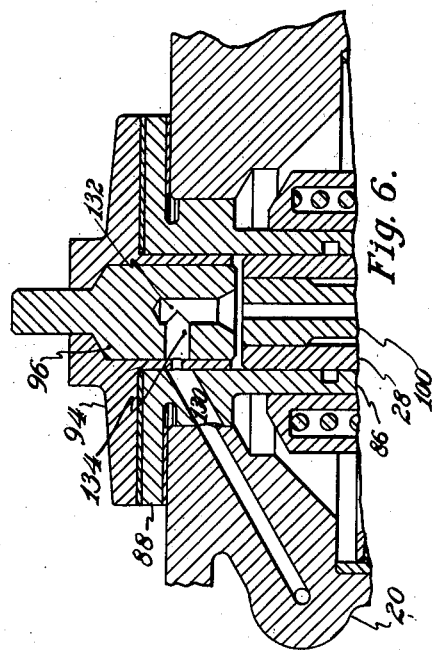
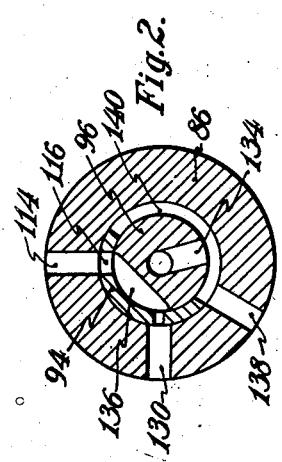
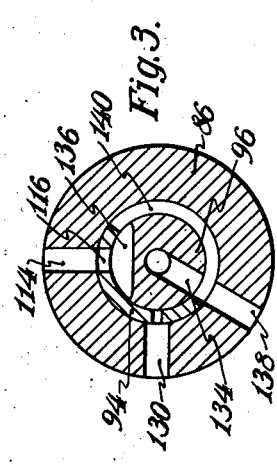
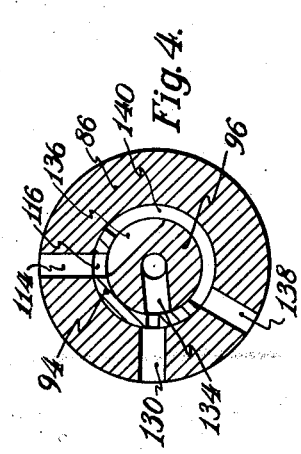
INVENTOR
Roland Chilton
BY
ATTORNEY Patented Dec. 7, 1937

2,101,239

UNITED STATES PATENT OFFICE 2,101,239

SUPERCHARGER DRIVE

Roland Chilton, Ridgewood, N. J., assignor, by mesne assignments, to The Reed Propeller Co., Inc., Garden City, N. Y., a corporation of New York Application August 14, 1934, Serial No. 739,765

7 Claims. (Cl. 74—290)

This invention relates to multiple speed supercharger drives, and in certain respects comprises improvements upon the co-pending application, Serial No. 680,495.

The object of supercharging in aircraft engines is to make up for the deficiency in atmospheric density at altitude and, by use of a sufficiently high gear ratio in the supercharger drive, normal sea level power may be maintained to relatively high altitudes. Engines with such superchargers, however, would be damaged if operated at full throttle at sea level because of the excessive power developed. Throttle stops are accordingly used and the pilot is instructed not to pass the stop until a specified altitude is reached.

Under such part throttle conditions there is little reduction in either the power required to drive the supercharger or in the temperature rise impressed on the inlet charge by the supercharger, and both these factors combine to enforce a relatively low sea level rating on altitude supercharged engines.

After take-off and climb, engines are cruised at reduced outputs, usually amounting to 75% of the maximum sea level rating, which output also often corresponds to the capacity of a naturally aspirated engine—that is, an engine without any supercharger, at full throttle. However, under these conditions the supercharger on a moderately supercharged engine will absorb 5% or more of the engine output, which is entirely wasted under cruising conditions. Objects of the present invention include the provision of improved means for overcoming these limitations.

Other objects of the invention are to provide a supercharger drive providing two-speed and neutral conditions. By use of the neutral condition, the impeller is entirely disconnected from the drive and may come to rest, whereupon the engine may be cruised at or near full throttle, and the horse power normally lost in the supercharger will be saved, giving increased fuel economy and range. The heating of the charge by the supercharger will also be prevented so that the engine will work under easier thermal conditions.

Another object of the invention is to provide a two-speed and neutral supercharger drive which shall be so compact as to be capable of installation in existing engines where the design initially contemplated only a single fixed ratio drive.

Another object of the invention is to provide a two-speed and neutral supercharger drive having a simplified control means and one wherein the control effort by the pilot is reduced to a mere finger pressure. Other objects will be obvious or will be pointed out in the following description.

In the drawings:

Fig. 2 is a transverse section through the control valve in "low" gear position;

Fig. 3 is a transverse section through the control valve in the "neutral" position;

Fig. 4 is a transverse section through the control valve in the "high" gear position;

Fig. 5 is an end view showing the control lever; and

Fig. 6 is a fragmentary axial section through the control valve at right angles to the plane of Fig. 1.

Figure 1:
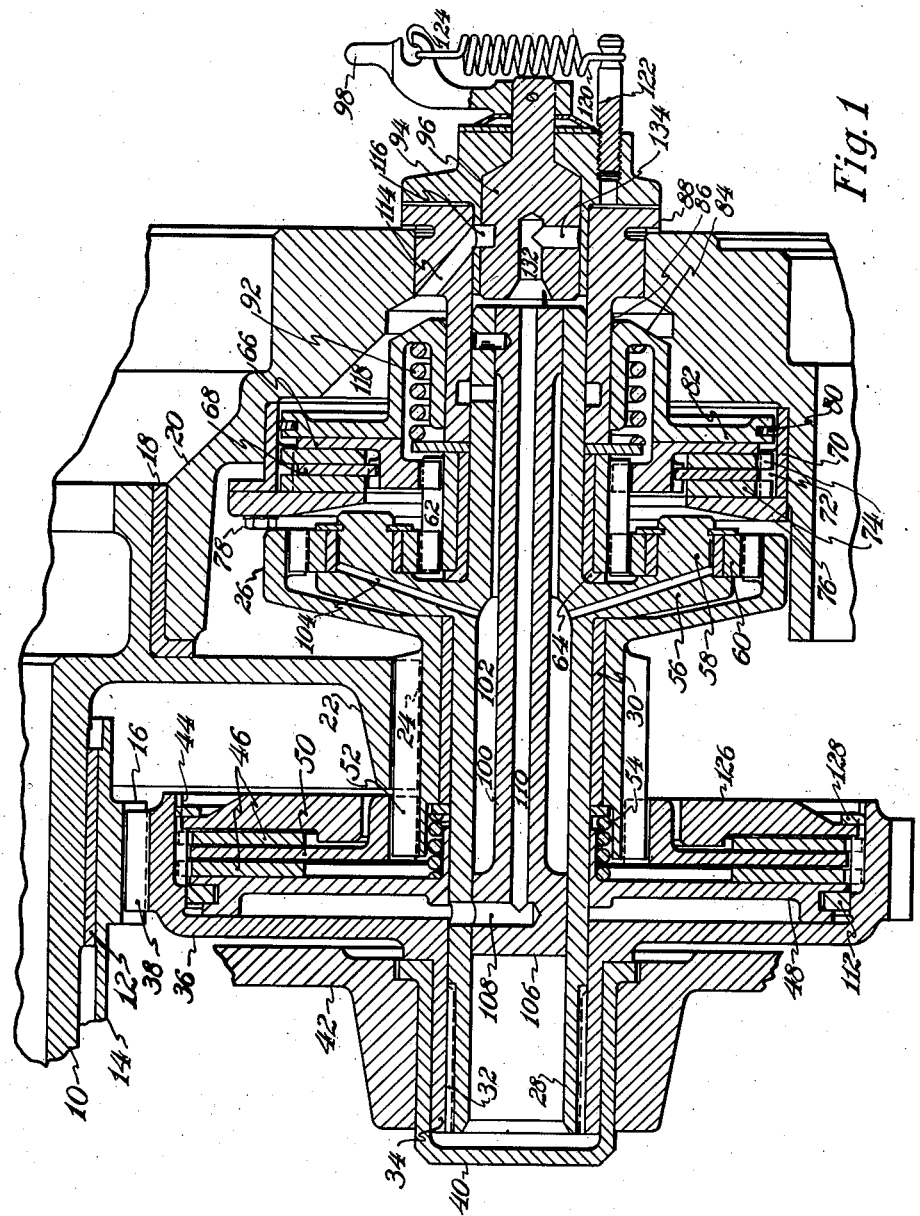
Fig. 1 is an axial section through the supercharger layshaft of this invention with the supercharger impeller shaft and the drive shaft from the engine shown in fragmentary section.

Referring first to Fig. 1, 10 designates a portion of a hollow drive shaft extending from the engine crankshaft, around which is mounted on bushings (one of which is shown at 12) the hollow supercharger impeller shaft 14 having the pinion teeth 16. The shaft 10 is supported in a bearing 18 in the rear housing 20, and is furnished with the main driving gear 22, here shown as integral with the shaft. This main driving gear meshes with the pinion 24, shown as integral with the annular gear 26, the whole being free to rotate on the layshaft 28 on the bushing 30. Splined at 32 on the layshaft 28 is the hub 34 of the impeller drive gear 36, which gear has teeth 38 meshing with the teeth of the supercharger pinion 16. The hub 34 supports the left hand end of the layshaft 28 through the bushing 40 in the housing 42. The rim of the gear 36 is provided with internal splines 44, with which are engaged teeth cut on the outer clutch plates 46. Engageable with these plates are the piston plate 48 and the intermediate plate 50, the latter having a spline 52 engaging the extended end of the teeth of the pinion 24. A spring 54 urges the piston 48 towards the retracted position shown. The piston 48 has a piston ring 112 engaging a cylindrical bore formed in the gear 36 beyond the splines 44. The clutch abutment plate 126 is secured within the gear 36 by a split ring 128 snapped into a groove in the splines 44.

Formed on the layshaft 28 are the arms 56 equipped with journals 58 whereon are mounted for free rotation the planet pinions 60, engaged with the annular gear 26 and with the sun pinion 62 which is mounted for free rotation about the layshaft on the bushing 64. Splined onto the right hand end of the extended teeth of the sun pinion 62 is the clutch member 66 and again splined to this clutch member is the clutch plate 68. Suitably secured to the housing 20 is a fixed drum 70 having internal splines 72 with which are engaged suitable teeth cut on the periphery of the intermediate clutch plates 74. The abutment plate 76 is secured to the drum 70, as by bolts 78. The right hand end of the drum 70 is bored out to comprise a cylinder engaged by the piston ring 80 carried in a groove in the piston member 82, which has a hub 84 free to slide on the bushing 86, which is secured in the housing by a suitable flange 88 by means of studs 90 (Fig. 5). A spring 92 urges the piston member 82 away from the engaged position shown.

The fixed bushing 86 serves as a bearing support for the right hand end of the layshaft 28. The valve housing 94 is also secured by the bolts 90 and houses the valve 96 operable by the lever 98. The valve is provided with a central bore 132, a radial hole 134, and a cut-away portion 136 (see Figs. 2, 3 and 4). The bushing 86 is further provided with a drain hole 138 communicating with the cut-away portion 140 of the valve housing 94.

A diagonal hole 114 is drilled through the bushing 86 to communicate with the hole 116 in the valve housing 94 and with the space 118 behind the piston 82. The control lever 98 is provided with a toggle spring 120 anchored to the pin 122, and the spring engages a flat face 124 of the lever, whereby the valve is stabilized in the neutral position. Hydraulic pressure is fed to the valve 96, through the oil pressure feed passage 130 (see Fig. 6) which is suitably connected to the engine lubrication system. The hollow layshaft 28 is provided with a tubular member 100 having an enlarged head 106 and which defines the exterior annular space 102, which conducts lubricant to the pinion journals 58 through the holes 104. The tubular member 100 has further an axial bore 110 and a radial hole 108 by which clutch actuating oil pressure is communicated to the piston 48 when the valve 96 is turned into the appropriate position.

The operation of the device will now be clear, as follows:

The engine drives the shaft 10, equipped with the main driving gear 22, which in turn drives the pinion 24 and the annular gear 26 at all times when the engine is running. The pinion 24, however, is free on the layshaft 28 which it may drive in either of two ways—(a) by engagement of the direct drive clutch plates 50 and 46, the supercharger drive gear 36 will be driven at unitary speed with the layshaft, giving high gear, during which the low gear or sun gear clutch plates 66, 68, 74, will be disengaged to permit the pinion 62 to turn at unitary speed with the rest of the layshaft parts. (b) If the high speed clutch 46, 50 be disengaged, and the low speed or sun pinion clutch 66, 68, 74 be engaged, as shown, then the layshaft and the supercharger drive gear 36 are driven through the planetary gears 26, 60, and the sun pinion 62 which is held locked to the housing.

It will be obvious that if both clutches be released, no drive will be transmitted to the supercharger pinion 16 so that the device will be in neutral position.

The porting of the valve body 94 and the valve 96 is as indicated in Figs. 2, 3 and 4 representing respectively the low, neutral and high gear positions of the valve, and it will be seen that in low gear position the valve connects the high gear clutch piston 48 to the drain hole 138, at the same time supplying pressure to the low gear clutch through the hole 114 and the valve port 136. In neutral position both high and low gear pistons are put into communication with the drain hole 138, while the pressure is cut off both clutches. In the high gear position, pressure is communicated with the high gear clutch, through the holes 130, 134, 132, 110 and 108, while the low gear clutch is drained through 136, 140, 138. It will be clear from Figs. 2, 3 and 4, that these relations cannot be disturbed by any manipulation of the valve 98, by which either or neither of the clutches may be subject to engaging pressure, it being impossible to have engaging pressure on both clutches at the same time.

With the novel supercharger drive of this invention, it is contemplated that engine operation will be at or near full throttle at all times, low altitude cruising being done in neutral under naturally aspirated conditions, low gear being engaged at moderate altitudes, and high gear at higher altitudes.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. The combination with a supercharger layshaft, of a pinion rotationally free from said shaft, a supercharger driving gear upon said shaft, a sun gear rotationally free upon the shaft, an annular gear rigid with the pinion, planet pinions engaging the last said gears, a clutch means adapted to lock the sun gear against rotation, a second clutch means adapted to lock the layshaft pinion to the layshaft, and means to engage either of said clutches and adapted to disengage both.

2. In a supercharger drive in combination, a layshaft, a pinion free for rotation on the layshaft, a clutch adapted to engage said pinion for rotation with the shaft, a planetary gear drivably connecting said pinion and shaft and having a sun gear, clutch means adapted to lock said sun gear against rotation, and hydraulic means adapted to engage and disengage said clutches.

3. The combination with an engine having a supercharger drive gear and a supercharger pinion, of a layshaft having a rotationally free pinion engaged with said gear and having a layshaft gear engaged with said supercharger pinion, a planetary gearset including a sun gear between said layshaft gear and said layshaft pinion, means to selectively clutch and declutch the layshaft gear directly to the layshaft pinion, and separate means to selectively free and restrain said sun gear as to rotation.

4. The combination with an engine having a casing, a supercharger drive gear and a supercharger pinion, of a layshaft laterally spaced from said gear and pinion axis, having mounted thereon a gear meshed with said pinion, a pinion on said layshaft meshed with said drive gear, selectively operable means to clutch said layshaft pinion to said layshaft gear, a ratio changing gearset connected with said layshaft gear and with said layshaft pinion, a reaction member in said gearset, and means selectively operable to clutch said reaction member to said casing, and to free said reaction members from restraint.

5. In a supercharger drive, in combination, a drive gear and a coaxial supercharger pinion, a layshaft having a pinion and gear respectively meshed with said drive gear and supercharger pinion, clutch means selectively operable to clutch the layshaft pinion for rotation with the layshaft gear, a speed changing mechanism operably connected between said layshaft pinion and said layshaft gear, selectively operable clutch means to place said speed changing mechanism in operative relationship between said layshaft pinion and said layshaft gear to enforce relative rotation of said pinion and gear, and a unitary control for both said clutch means having one position for disengagement of both, one position for engagement of one and disengagement of the other, and one position for engagement of other and disengagement of the one said clutch means.

6. The combination with a support and a supercharger layshaft mounted thereon, of a pinion mounted for rotation on the shaft, a driving gear mounted on the shaft, selectively operable clutch means to connect the gear for rotation with the pinion, a speed changing gear set between said pinion and gear in driving connection with each, said gearset including a reaction member freely rotatable on the shaft in either direction, and a second selective clutch organized in one position of adjustment to hold said reaction member from rotation and in another position of adjustment to release said reaction member for free rotation.

7. The combination in a supercharger drive including a drive gear, a supercharger pinion, a layshaft having gears respectively engaged with the driving gear and pinion, of a change speed gear between said layshaft gears, and at least two selectively and reciprocally operable clutches for engaging the layshaft gears for direct drive, for engaging the change speed gear between the layshaft gears, and for severing both of said driving engagements.

ROLAND CHILTON.